United States Patent [19]

Rush

[11] Patent Number: 4,787,961

[45] Date of Patent: Nov. 29, 1988

[54] BELT CONSTRUCTION, TENSILE BAND SET THEREFOR AND METHODS OF MAKING THE SAME

[75] Inventor: James B. Rush, Springfield, Mo.

[73] Assignee: Dayco Products, Inc., Dayton, Ohio

[21] Appl. No.: 137,285

[22] Filed: Dec. 23, 1987

[51] Int. Cl.$^4$ ............................................. C25D 1/02
[52] U.S. Cl. ....................................................... 204/9
[58] Field of Search ................................ 204/3, 4, 9

[56] References Cited

U.S. PATENT DOCUMENTS

| | | | |
|---|---|---|---|
| 3,604,283 | 9/1971 | Van Doorne | 74/231 M |
| 3,799,859 | 3/1974 | Wallin | 204/216 |
| 3,959,109 | 5/1976 | Hambling et al. | 204/212 |
| 4,332,575 | 6/1982 | Hendriks | 474/201 |
| 4,579,549 | 4/1986 | Okawa et al. | 474/242 |

Primary Examiner—T. M. Tufariello
Attorney, Agent, or Firm—Joseph V. Tassone

[57] ABSTRACT

A belt construction, a tensile band set thereof and method of making the same are provided, the tensile band set comprises a plurality of separate looped endless bands disposed in superimposed relation with at least one band of the set having been electroformed.

30 Claims, 3 Drawing Sheets

BELT CONSTRUCTION, TENSILE BAND SET THEREFOR AND METHODS OF MAKING THE SAME

BACKGROUND OF THE INVENTION

1. Field of the Invention

This invention relates to a new belt construction and to a new tensile band set therefor as well as to new methods of making the same.

2. Prior Art Statement

It is known to provide a belt construction having a tensile band set that comprises a plurality of separate looped endless bands disposed in superimposed relation. For example, see the U.S. Pat. Nos. 3,604,283 to Van Doorne, 4,332,575 to Hendriks, and 4,579,549 to Okawa et al.

It is also known to form a single endless band by plating that band from. material in an electroplating bath, the prior known method comprising the steps of disposing a mandrel in the bath and plating material from the bath onto an endless surface of the mandrel to form a band. For example, see the U.S. Pat. Nos. 3,799,859 to Wallin and 3,959,109 to Hambling et al.

SUMMARY OF THE INVENTION

It is one feature of this invention to provide a new method of making a tensile band set for belt constructions and the like wherein at least one of the bands is uniquely formed.

In particular, it is believed according to the teachings of this invention that at least one band of a tensile band set can be electroformed.

For example, one embodiment of this invention provides a method of making a tensile band set wherein the band set comprises a plurality of separate looped endless bands disposed in superimposed relation, the method comprising the step of electroforming at least one band of the set thereof.

It is also believed according to the teachings of this invention that at least one band of a tensile band set can be formed on the next adjacent inner band of that set whereby that next adjacent inner band of the set provides a mandrel that shapes that one band as it is being formed thereon.

For example, one embodiment of this invention provides a method of making a tensile band set wherein the band set comprises a plurality of separate looped endless bands disposed in superimposed relation, the method comprising the step of forming at least one band of the set on the next adjacent inner band of that set.

Accordingly, it is an object of this invention to provide a new method of making a tensile band set wherein the band set comprises a plurality of separate looped endless bands disposed in superimposed relation, the method of this invention having one or more of the novel features of this invention as set forth above or hereinafter shown or described.

Another object of this invention is to provide a new tensile band set wherein the band set comprises a plurality of separate looped endless bands disposed in superimposed relation, the tensile band set of this invention having one or more of the novel features of this invention as set forth above or hereinafter shown or described.

Another object of this invention is to provide a new belt construction having a tensile band set that comprises a plurality of separate looped endless bands disposed in superimposed relation, the belt construction of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENTS

Figure 1:
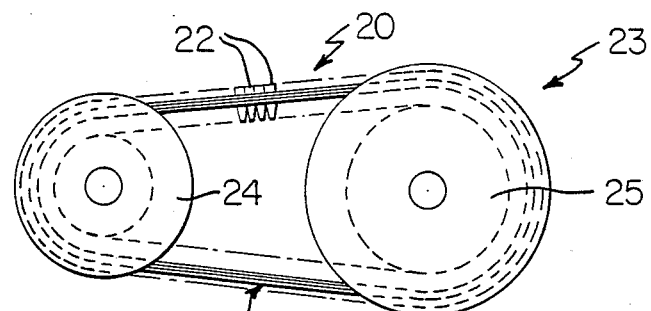
FIG. 1 is a schematic side view illustrating a new belt construction of this invention forming part of a variable transmission means.

While the various features of this invention are hereinafter illustrated and described as being particularly adapted to provide a belt construction particularly adapted to drive a continuously variable transmission, it is to be understood that the various features of this invention can be utilized singly or in various combinations thereof to provide a belt construction for other purposes as desired.

Therefore, this invention is not to be limited to only the embodiments illustrated in the drawings, because the drawings are merely utilized to illustrate one of the wide variety of uses of this invention.

Figure 8:
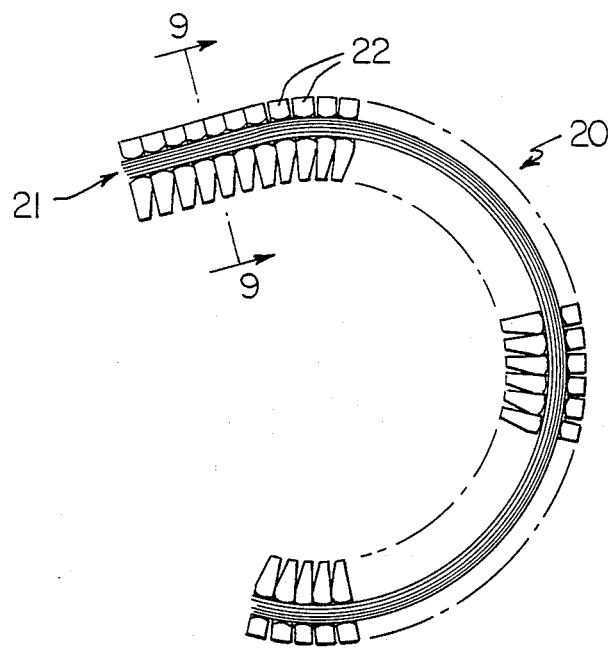
FIG. 8 is an enlarged, fragmentary side view of the belt construction of FIG. 1.

Referring now to FIGS. 1 and 8, a new belt construction of this invention is generally indicated by the reference numeral 20 and comprises a tensile band set that is generally indicated by the reference numeral 21 carrying a plurality of belt elements 22 for the purpose of operating a continuously variable transmission means that is generally indicated by the reference numeral 23 in FIG. 1 and comprising a pair of pulleys 24 and 25 having the belt construction 20 looped therebetween in a manner well known in the art. For example, see the aforementioned U.S. Pat. Nos. 3,604,283 to Van Doorne, 4,332,565 to Hendriks, and 4,579,549 to Okawa et al, whereby these three U.S. patents are being incorporated into this disclosure by this reference thereto.

Therefore, since a continuously variable transmission (CVT) belt construction is well known in the art, only the details of the unique tensile band set 21 of this invention will now be described.

However, it is to be understood that the tensile band set 21 of this invention can be utilized for purposes other than forming a CVT belt construction. For example, the band set 21 of this invention can be utilized to provide other power transmission products such as, but not limited to, synchronous, polyrib, flat and "V" belt constructions. In fact, the various parts of the belt construction can be cast onto or around the band set 21 so that the band set 21 provides the tensile means for such a belt construction.

Also, it may be found that just one individual band made by the method of this invention can form the tensile means of a belt construction.

Figure 9:
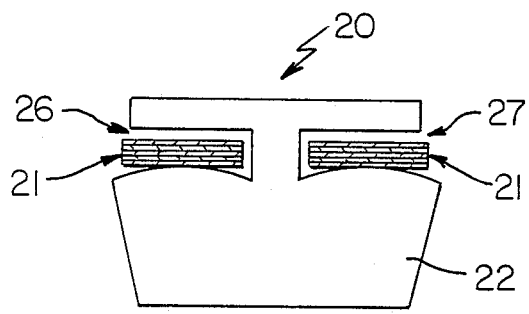
FIG. 9 is an enlarged cross-sectional view taken on line 9—9 of FIG. 8.
Figure 10:
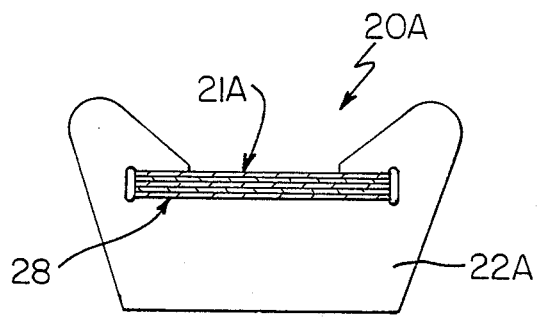
FIG. 10 is a view similar to FIG. 9 and illustrates another type of belt construction that can utilize one of the tensile band sets of this invention.

Nevertheless, it can be seen in FIG. 9 that the belt construction 20 has two band sets 21 respectively cooperating in slot means 26 and 27 of the individual belt elements 22 as set forth in the aforementioned U.S. Pat. No. 4,579,549 to Okawa et al. However, in the CVT belt construction 20A illustrated in FIG. 10, only one band set 21A of this invention is utilized in a single slot means 28 of the belt elements 22A in the manner set forth in the aforementioned U.S. Pat. No. 4,332,575 to Hendriks.

As is well known, a tensile band set is formed from a plurality of separate looped endless bands subsequently disposed in a nested and superimposed relation and normally being free to move relative to each other even though the spacing between adjacent bands is relatively small. However, it has been found that when using the prior known methods of making the individual bands, it is relatively difficult to maintain tolerances that permit a close spacing between adjacent bands in the resulting band set.

Figure 6:
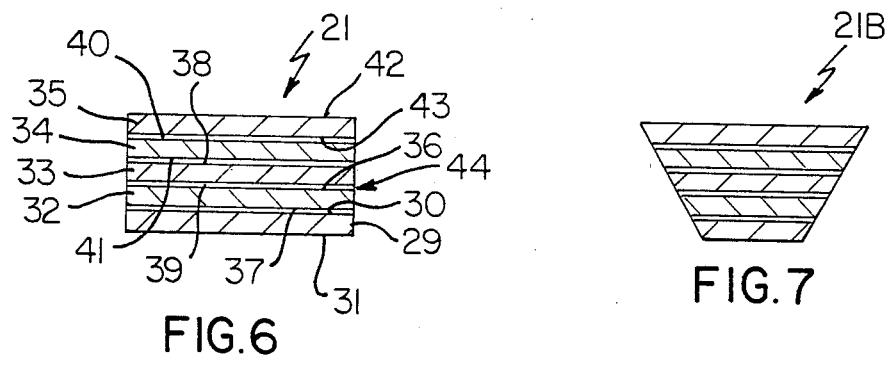
FIG. 6 is an enlarged cross-sectional view taken on line 6—6 of FIG. 5.

For example, the band set 21 of this invention as illustrated in FIG. 6 has an innermost substantially flat band 29 provided with opposed flat parallel sides 30 and 31 with the side 31 forming the inner surface of the band set 21. The band set 21 illustrated in FIG. 6 in addition to the innermost band 29 comprises bands 32, 33, 34 and 35 disposed in superimposed relation with the band 32 having opposed outer and inner flat parallel sides 36 and 37, the band 33 having opposed outer and inner flat parallel sides 38 and 39, the band 34 having opposed flat parallel outer and inner opposed sides 40 and 41 and the band 35 having opposed outer and inner flat parallel sides 42 and 43 as illustrated whereby the outer surface 42 of the outer band 35 defines the outer surface of the band set 21. The spacing between adjacent bands 28, 32, 33, 34 and 35 of the band set 21 is generally indicated by the reference numeral 44 in FIG. 6 and such spacing may be smaller or larger than illustrated in FIG. 6 as desired.

Figure 4:
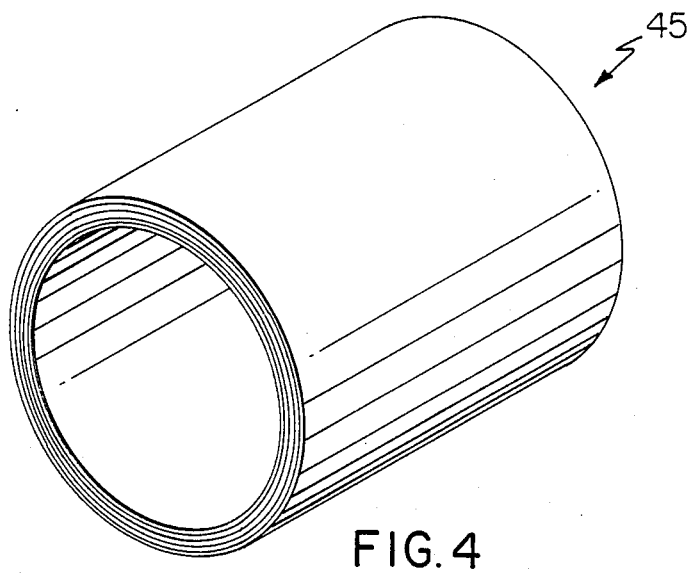
FIG. 4 is a perspective view illustrating an elongated tensile band set of this invention that has been made by the method of FIGS. 2 and 3.
Figure 5:
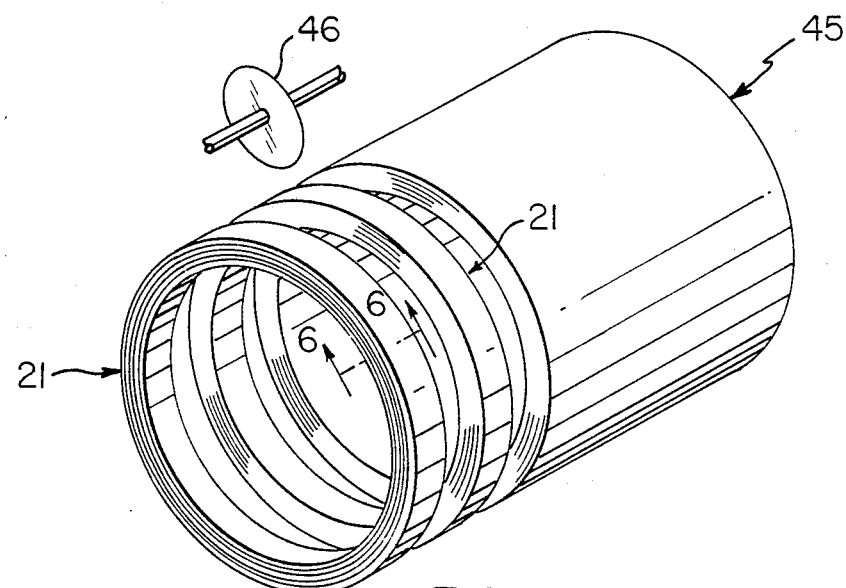
FIG. 5 is a view similar to FIG. 4 and illustrates how the band set of FIG. 4 can be cut into a plurality of narrower band sets.

The band set 21 illustrated in FIG. 6 has been formed according to the teachings of this invention in a manner hereinafter set forth and has been cut from an elongated band set that is generally indicated by the reference numeral 45 in FIG. 4 as a relatively long band set 45 can be formed by the method of this invention as illustrated in FIG. 4 to be subsequently cut into the narrower band sets 21 by suitable cutting means 46 as illustrated in FIG. 5 in a manner well known in the cutting art.

Figure 7:
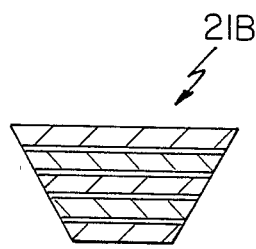
FIG. 7 is a view similar to FIG. 6 and illustrates another configuration of the tensile band set of this invention.

In fact, the cutting means 46 could be so designed that the same cuts the narrower band sets 21 into the "V" shape illustrated by the reference numeral 21B of FIG. 7 or in other desired shapes rather than in the conventional rectangular arrangement illustrated in FIG. 6, if desired.

As previously stated, it is believed according to the teachings of this invention that at least one of the bands 32-35 of the band set 21 can be formed on the next adjacent inner band of the set 21 so that that next adjacent inner band provides a shaping mandrel for that one band as the same is being formed.

Figure 2:
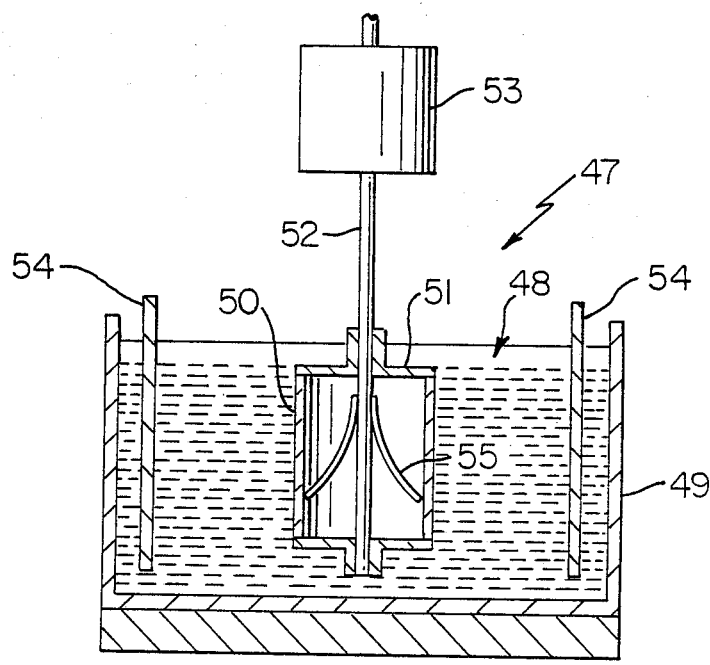
FIG. 2 is a schematic cross-sectional view illustrating one of the steps of the method of this invention for forming the tensile band set of the belt construction of FIG. 1.

For example, reference is now made to FIG. 2 wherein an apparatus 47 is provided and comprises an electroplating bath 48 contained within an open ended container means 49 and being adapted to have the material thereof electroplated onto a continuous cylindrical surface 50 of a mandrel 51 that is fixed to a rod 52 that is adapted to be rotated by a motor means 53 in a manner fully set forth in the aforementioned U.S. Pat. Nos. 3,959,109 to Hamling et al, and 3,799,859 to Wallin, whereby these two U.S. patents are being incorporated into this disclosure by this reference thereto.

Thus, since the details of the structure, material and operation of the apparatus 47 is well known only the details thereof necessary to understand the unique features of this invention will now be described.

The apparatus 47 comprises two rigid metallic anode plates 54 that are adapted to be interconnected to one terminal of a suitable electrical supply (not shown) while the metallic surface 50 of the cylindrical mandrel 51 is adapted to be a cathode by being interconnected to the other terminal of the electrical supply through conductive metallic spring fingers 55 as fully set forth in FIG. 1 of the aforementioned U.S. Pat No. 3,959,109 to Hambling et al.

In this manner, by rotating the mandrel 51 by the motor means 53, while at the same time interconnecting the cathode 50 and anodes 54 to the electrical power supply, a certain amount of the material in the electrolyte or bath 48 is adapted to be plated onto the surface 50 and form a continuous or endless annular band thereon which is readily removable from the surface 50 and which, in the embodiment illustrated in the drawings, comprises the innermost band means 29 of the band set 45 illustrated in FIG. 4.

Thus, it can be seen that by selecting the proper electrolyte or bath 48, the value of the electrical power source for the cathode 50 and anodes 54, the length of time of operating the apparatus 47, the rate of rotation of the mandrel 51 and the distance of the anodes 54 relative to the rotating mandrel 51, the thickness of the resulting annular band being plated on the surface 50 can be accurately controlled so that the innermost band being formed thereon will have the desired thickness throughout the entire area thereof. In fact, it is believed that the thickness is precisely determined by the amps times the time the electrical supply is applied to the apparatus 47 and that the resulting seamless band is of uniform thickness and circumference with the grain (strength) orientation in the hoop direction thereof which is highly desired for a resulting tensile band set.

While the aforementioned U.S. Pat. Nos. 3,959,109 to Hambling et al, and 3,799,859 to Wallin set forth various electrolytes for forming various individual metallic bands in the above manner, it is believed according to the teachings of this invention that when nickel is plated from the electrolyte 48 onto the mandrel 51 in the above manner, that resulting nickel band can be subsequently treated with a copper solution so that additional nickel from the electrolyte 48 will not plate on itself so as to be secured thereto so that a separate band could then be plated on top of the previously plated band and those two bands would be completely separate from each other but would be disposed closely adjacent to each other.

Thus, it is a feature of this invention to remove the mandrel 51 from the bath 48 after the first innermost band of metallic material has been plated thereon in the manner previously set forth and then to immerse that plated mandrel 51 into a solution that coats the plated material with the means that prevents a subsequent plating thereon from being secured to the already plated material whereby the thus coated and plated mandrel 51 can be reimmersed into the bath 48 to have a second annular band plated thereon in the manner previously set forth. This process then can be repeated back and forth between the metallic bath and the coating solution so that a complete band set can be formed on the same mandrel 51 with each outermost band being plated on top of the previously plated annular band while being prevented from being secured thereto by the coating on the previously plated material. It is also believed that when nickel is being plated to form a plated band by the apparatus 47 and the solution that is subsequently coated on the plated band comprises a copper solution, the space that results between the bands will each be in the order of one molecule layer thick or the like with each band being of a uniform thickness throughout its entire area.

Figure 3:
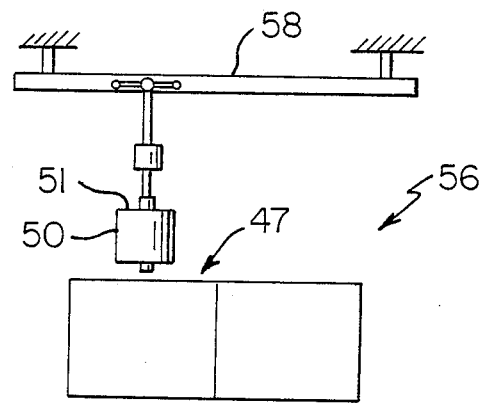
FIG. 3 is a reduced schematic view illustrating another step of the method of this invention for forming the tensile band set of the belt construction of FIG. 1.

For example, reference is now made to FIG. 3 wherein another apparatus of this invention is generally indicated by the reference numeral 56 and comprises the apparatus 47 as well as a container means 57 which has the copper treating solution therein and the mandrel 51 is carried on a track means 58 which is adapted to raise and lower the mandrel 51 from the apparatus 47 to the solution 57 and then back to the apparatus 47 to immerse the mandrel 51 into the bath 48 in the manner previously described, such lateral and up and down movement of the mandrel 51 by the track means 58 being fully set forth in the aforementioned U.S. Pat. No. 3,799,859 to Wallin.

While the use of nickel to form the bands of this invention has been previously described, it is to be understood that other metallic material can be utilized, such as steel, stainless steel, etc. Also, instead of disposing the plated mandrel 51 in a solution to prevent plating thereon, the means for preventing plating could be merely washed on or otherwise applied to the coated mandrel, if desired.

Therefore, it can be seen that the method of this invention is adapted to form at least one band of a band set on the next adjacent inner band of that set and that the electroforming step of forming such one band can be utilized to serially form all of the bands in a band set.

Figure 11:
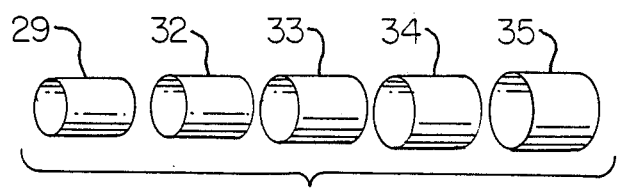
FIG. 11 is a reduced perspective view illustrating how a plurality of bands made by the method of this invention can be assembled into a band set by the step of nesting the bands together.

However, it is to be understood that it is also a feature of this invention to form a tensile band set by separately forming the bands and then nesting those bands together in the manner illustrated in FIG. 11 as at least one or all of the bands for the band set could be formed on separate mandrels 51 of different sizes to permit such subsequent nesting relation.

Therefore, it can be seen that another method of this invention is adapted to form at least one band of a tensile band set by electroforming.

Therefore, it can be seen that this invention not only provides a new method of making a tensile band set, but also this invention provides a new belt construction and a new tensile band set for such a belt construction or the like.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a method of making a tensile band set wherein said band set comprises a plurality of separate looped endless bands disposed in superimposed relation, the improvement comprising the step of electroforming at least one band of said set.

2. A method as set forth in claim 1 and including the step of electroforming each band of said set.

3. A method as set forth in claim 2 and including the steps of separately electroforming each band of said set, and then nesting said bands to form said set thereof.

4. A method as set forth in claim 1 wherein the step of electroforming said one band of said set comprises the steps of disposing a mandrel in an electroplating bath, and plating material from said bath onto an endless surface of said mandrel whereby the plated material forms said one band of said set on said surface of said mandrel.

5. A method as set forth in claim 4 wherein said material of said bath comprises metallic material.

6. In a tensile band set wherein said band set comprises a plurality of separate looped endless bands disposed in superimposed relation, the improvement wherein at least one band of said set has been electroformed.

7. A tensile band set as set forth in claim 6 wherein each said band of said set has been electroformed.

8. In a belt construction having a tensile band set that comprises a plurality of separate looped endless bands disposed in superimposed relation, the improvement wherein at least one band of said set has been electroformed.

9. A belt construction as set forth in claim 8 wherein each of said bands of said set has been electroformed.

10. In a method of making a tensile band set wherein said band set comprises a plurality of separate looped endless bands disposed in superimposed relation, the improvement comprising the step of forming at least one band of said set on the next adjacent inner band of said set.

11. A method as set forth in claim 10 wherein the step of forming said one band of said set comprises the step of electroforming said one band on said next adjacent inner band of said set.

12. A method as set forth in claim 11 and including the step of electroforming the innermost band of said set.

13. A method as set forth in claim 12 and including the step of serially electroforming each band of said set on the next adjacent inner band of said set after the step of electroforming said innermost band of said set.

14. A method as set forth in claim 13 and including the step of serially disposing on each inner band of said set after that inner band has been formed a means that prevents the next adjacent outer band being electroformed thereon from being secured thereto.

15. A method as set forth in claim 10 and including the step of forming a plurality of narrower band sets from the first-mentioned band set after the first-mentioned band set has been made.

16. A method as set forth in claim 15 wherein the step of forming a plurality of narrower band set comprises the step of cutting the first-mentioned band set.

17. A method as set forth in claim 10 and including the step of electroforming the innermost band of said set.

18. A method as set forth in claim 17 wherein the step of electroforming said innermost band of said set comprises the steps of disposing a mandrel in an electroplating bath, and plating material from said bath onto an endless surface of said mandrel whereby the plated material forms said innermost band of said set on said surface of said mandrel.

19. A method as set forth in claim 18 and including the step of rotating said mandrel in said bath while said material is being plated thereon.

20. A method as set forth in claim 19 wherein the step of forming said one band of said set comprises the step of plating additional material on said innermost band after said innermost band has been formed to the desired thickness whereby the plated additional material forms said one band of said set.

21. A method as set forth in claim 20 and including the step of disposing means on said innermost band of said set before the step of plating the additional material on said innermost band so that said one band will not be secured to said innermost band during the step of plating the additional material thereon.

22. A method as set forth in claim 21 wherein the step of disposing means on said innermost band of said set comprises the steps of removing said mandrel from said bath after said innermost band has been formed to the desired thickness, disposing the plated mandrel in a solution of said means so that said means is coated on said innermost band, and then disposing the coated and plated mandrel back into said bath so that said one band can then be plated thereon by the step of plating additional material thereon.

23. A method as set forth in claim 22 wherein said material of said bath comprises nickel.

24. A method as set forth in claim 23 wherein said solution comprises a coppe solution.

25. In a tensile band set wherein said band set comprises a plurality of separate looped endless bands disposed in superimposed relation, the improvement wherein at least one band of said set has been formed on the next adjacent inner band of said set.

26. A tensile band set as set forth in claim 25 wherein said one band of said set has been electroformed on said next adjacent inner band of said set.

27. A tensile band set as set forth in claim 26 wherein the innermost band of said set has also been electroformed.

28. A tensile band set as set forth in claim 27 wherein each band of said set has been electroformed on the next adjacent inner band of said set after said innermost band of said set had been electroformed.

29. In a belt construction having a tensile band set that comprises a plurality of separate looped endless bands disposed in superimposed relation, the improvement wherein at least one band of said set has been formed on the next adjacent inner band of said set.

30. A belt construction as set forth in claim 29 wherein said one band of said set has been electroformed on said next adjacent inner band of said set.

* * * * *